United States Patent [19]

Moran et al.

[11] Patent Number: 4,540,593
[45] Date of Patent: Sep. 10, 1985

[54] REDUCED FAT SPREAD AND A PROCESS FOR THE PRODUCTION THEREOF

[75] Inventors: David P. J. Moran, Covington; Iain J. Campbell, Wellingborough, both of England

[73] Assignee: Lever Brothers Company, New York, N.Y.

[21] Appl. No.: 511,607

[22] Filed: Jul. 7, 1983

[30] Foreign Application Priority Data

Jul. 8, 1982 [GB] United Kingdom ............... 8219843

[51] Int. Cl.$^3$ .......................... A23D 3/00; A23D 3/02
[52] U.S. Cl. ...................................... 426/603; 426/604
[58] Field of Search ................................ 426/603, 604

[56] References Cited

U.S. PATENT DOCUMENTS

| | | | |
|---|---|---|---|
| 3,266,904 | 8/1966 | Duin et al. | 426/604 |
| 3,946,122 | 3/1976 | Scharp | 426/604 |
| 4,071,634 | 1/1978 | Wilton et al. | 426/604 |
| 4,307,125 | 12/1981 | Amer | 426/604 |
| 4,315,955 | 2/1982 | Cramer | 426/604 X |
| 4,362,758 | 12/1982 | MacNeill et al. | 426/604 X |
| 4,443,487 | 4/1984 | Darling | 426/603 |

FOREIGN PATENT DOCUMENTS 1550138 8/1979 United Kingdom .

OTHER PUBLICATIONS

Andersen, A. J. C., et al., "Margarine", Pergamon Press, N.Y., 1954, pp. 228-231.

*Primary Examiner*—Robert Yoncoskie
*Attorney, Agent, or Firm*—Milton L. Honig; James J. Farrell

[57] ABSTRACT

A process for producing a reduced fat spread, comprising churning an oil-in-water-cream in the absence of an air/water interface, to increase its viscosity up to a value close to or equal to the peak viscosity, achieve partial phase inversion and obtain a spread with substantially the same level of fat as the starting cream, said spread comprising a network of aggregated fat and both encapsulated and free aqueous phase.

21 Claims, No Drawings

REDUCED FAT SPREAD AND A PROCESS FOR THE PRODUCTION THEREOF

The present invention relates to a reduced fat spread and to a process for the production thereof.

Spreads, particularly dairy butter, can be produced by churning a cream, which can be a reconstituted cream or a dairy cream. Churning can be described as a process of agglomeration and coalescence of fat globules. During the process the aggregates increase in size and eventually separate from the serum phase. Under suitable conditions separation of the fat globules occurs with occlusion of a small amount of serum phase, and phase separation of the globules and the bulk of the serum phase takes place.

Churning is conventionally carried out in a rotating drum or using equipment such as a so-called Fritz machine. In the conventional process, also called aeration-churning, the interface between air and the cream plays an important role in destabilizing the emulsion.

An alternative process involves the concentration of cream from a fat level of 30 wt. % to a fat level of 80% or more, destabilisation by shear and emulsification.

When low-fat spreads are produced by aeration-churning, some air bubbles may remain in the emulsion, resulting in a product of variable texture.

Spreads in the form of o/w emulsions have very attractive properties. They display a relatively high degree of coolness, plasticity and release of flavours and are less waxy and less hard than their fat-continuous counterparts. The shelf stability of water-continuous spreads, however, can be limited.

Spreads of the fat-continuous type (w/o emulsions) generally display a higher degree of hardness and waxiness and a relatively low degree of plasticity, coolness and release of water-soluble components and aromatic flavours, but have good keeping qualities when stored for a relatively long period.

There is need of a low-fat spread which combines the advantages of emulsions of both types which can be produced according to an economical and controllable process enabling the production of a spread of constant quality from a cream, without loss of buttermilk or aqueous phase in general.

Applicants have found a process for producing a spread having an intermediate structure partway between a fat-continuous emulsion and a water-continuous emulsion which meets the above desiderata.

The process according to the invention comprises:
(a) producing an oil-in-water emulsion-cream containing 35–75 wt. % of an aqueous phase and 25–65 wt. % of a fat phase with the following fat solids profile: $N_5=40-75$, $N_{15}=20-60$, $N_{25}=5-45$, $N_{35}=0-10$;
(b) subjecting said cream to shear-churning in the absence of an air/water interface at a temperature at which at least part of the fat is present in crystallized form, to increase its viscosity up to a value close to or equal to the peak viscosity whereby partial phase inversion is achieved, to obtain a spread with substantially the same level of fat as the starting cream, said spread comprising a network of aggregated fat and both encapsulated and free aqueous phase.

By shear-churning is understood a process during which aggregation of fat droplets occurs in the absence of an air/water interface and is dependent on droplet collision and subsequent aggregation. The process can be carried out, for instance, in a static mixer, a jacketed tank fitted with a gate stirrer with a scraped wall blade, or any other suitable temperature-controlled agitated vessel. There are three stages which can be distinguished during the churning process. During the first stage with a minimum of shear, fat crystals growing in the neighbourhood of the interface protrude into the water phase, flocculate and cause a small rise in viscosity. During the second stage of the process, under further shear the viscosity of the flocculated cream decreases owing to disruption of the structure.

During the third stage, the floccules swell and entrap some of the aqueous phase, fat granules start to be formed, the viscosity rises again and the viscosity peak is reached. If churning is continued, said granules coalesce and become very large and lose the ability to entrap serum. The serum drains away and a phase separation of fat and aqueous phase (e.g. buttermilk) takes place. The viscosity decreases and falls again. The fat grains tend to combine, thereby enhancing the separation of a fat-rich phase. After this stage and at higher shear, some of the aqueous phase is absorbed into the fat-rich phase and complete inversion occurs. As mentioned above, the churning process according to the invention is carried out up to the point where the peak viscosity (second viscosity peak) is almost reached and shear churning is then stopped.

The viscosity is measured, e.g. with a Ferranti-viscosimeter, type Couette, either in-line or by suspending a suitable measuring device in the reaction vessel. As mentioned above, the level of fat in the cream ranges from 25 to 65%. Creams having a level of fat higher than about 65 wt % are very prone to phase inversion or, put in other words, it is very difficult to control the process of inversion and complete phase inversion could occur instead of the state of limited inversion aimed at in the present invention.

Creams having a fat level lower than 25 wt % are extremely difficult to churn, i.e. phase inversion is difficult to achieve.

The preferred level of fat therefore ranges from 30 to 50 wt %.

An important factor governing the churnability is the level of the fat crystals in the cream. Applicants have found that it is important that the level of fat present in crystallized form in the cream at the churning temperature ranges from 5 to 50 wt %, preferably from 10 to 25 wt %, based on the total cream. It is therefore important that the cream contains appropriate fats and that the temperature of the cream prior to and during churning allows sufficient fat to crystallize. A churning temperature between 12° and 21° C. will be adequate in most cases. Preferably a churning temperature ranging from 13° to 17° C. is applied.

In some instances it is useful to pre-crystallize the cream prior to churning, by cooling it and keeping it at a low temperature for a period of time sufficient to allow the required amount of solid fat crystals to be formed. In most instances, cooling the cream to a temperature between 2° C. and 10° C., keeping it within this temperature range for 0.5 to 3 hours, will be adequate.

It is also possible to pre-crystallize the cream in-line by feeding the cream through for instance a Votator A unit (cooled to −10° to −25° C.). The temperature of the cream leaving the A units is between about 2° and 15° C. The cream is subsequently fed into a jacketed vessel where the temperature is controlled and no shear is applied. The cream containing the required level of fat solids is then fed into e.g. a static mixer, where shear churning is allowed to take place in the absence of air up to a point close to the peak viscosity. It is important to note that one should ensure that during cooling and after having reached the required fat solids level, the amount of shear should be kept at a minimum until the last phase of the churning operation is allowed to take place.

Another factor influencing the churnability is the size of the initial, dispersed oil drops in the cream. When the size ranges from 2 to 15 microns, a relatively high energy shearing regime will be appropriate.

In the case where creams are used having dispersed oil drops with a diameter ranging from 15 to 40 microns, a relatively low energy shearing regime will be appropriate.

In the case where the droplet size is greater than about 25 microns, it is not necessary to pre-crystallize the cream prior to churning. It is in this case perfectly adequate to achieve the required level of solid fat crystals in-line using surface-scraped heat-exchangers (Votator A units).

The cream which is subjected to shear-churning may consist of dairy cream. It is also possible to start from a reconstituted cream produced from an aqueous phase and a fat comprising hydrogenated and/or non-hydrogenated fats or fractions thereof, selected from tallow fat, palm oil, palm kernel oil, babassu oil, coconut oil, butter oil and liquid oils wherein at least 60% of the fatty acid residues contain 18 or more carbon atoms, such as soybean oil, sunflower oil, cotton seed oil, maize oil, rapeseed oil and the like.

If the pre-emulsion (reconstituted cream) is too coarse, the size of the dispersed drops can be reduced to e.g. 2-10 microns by homogenization, e.g. using an ultrasonic homogenizer. (The size of the drops can be measured with a Coulter Counter.)

It is useful to add to the cream an emulsifying system. Applicants have found that useful emulsifying systems are those which promote the wettability of the fat crystals by the aqueous phase. Particularly useful are emulsifiers conferring on the fat crystal surface at the interface (oil/water) a contact angle which exceeds about 90 degrees (measured in the oil phase) and preferably exceeding 100 degrees.

The preferred emulsifying system comprises lecithins, unsaturated monoglycerides, sorbitan fatty acid esters, sodium stearoyl lactylate or mixtures thereof. The appropriate level of emulsifier can easily be determined in each particular case.

The churning cream may also contain water binding agents such as guar gum, carboxymethylcellulose (CMC), locust bean gum, or a high level of proteins. These additives appear to control sensory properties such as stickiness, thickness, waxiness and firmness on the palate.

The churning process can either be carried out batch-wise or in a continuous way as outlined above, using a sequence of Votator units and e.g. a static mixer. It is possible to process a single cream in a single flow, but also to split-feed a single cream in two portions through step (b) and process under conditions achieving different degrees of churning by stopping the churning reaction at pre-selected points in time or stages before the viscosity peak in the third stage of the shear churning process outlined above.

It is also possible to use two or more creams with different compositions and to split-feed these through step (b) and process under conditions achieving different degrees of churning, whereafter the products are combined.

The new oil- and water-containing edible spread obtainable according to the process as outlined above are characterized by:
(i) a level of 35-75 wt % of an aqueous phase;
(ii) a level of 25-65 wt % of a fat having the following fat solids profile:

$$N_5 = 40\text{-}75;\ N_{15} = 20\text{-}60;\ N_{25} = 5\text{-}45;\ N_{35} = 0\text{-}10;$$

(iii) An electric conductivity exceeding 1000 microScm$^{-1}$;
(iv) A hardness expressed in C values measured at 5° C. exceeding 70 g/cm$^2$;

said spread comprising a network of partially aggregated fat and containing both encapsulated and free aqueous phase.

It is an important feature of the new "limited inversion" spreads according to the invention that these are substantially free from occluded air, whereby they differ from the variable textured low-fat products produced by conventional aeration-churning.

Useful fats and emulsifiers which constitute important components of the spread are preferably those described above in the specification.

The preferred range of hardness of the product, expressed in C-value measured at 5° C., is 70-2000 g/cm$^2$. Within this range the consistency of the spread is optimal.

The preferred electric conductivity values of the spreads according to the invention range from 1000 to 6000 microScm$^{-1}$. Within this preferred range the organoleptic properties of the spread (butter-likeness) are optimal.

In the specification and in the following examples the hardness of the product was measured according to the method as described by Haighton in Journal of the Am. Oil Chem. Soc., 36 (1959), pp. 345-348.

The fat solids profile was measured according to the method as described by Van Putte and Van den Enden in J. Am. Oil Chem. Soc., 51 (1974), p. 316.

The invention will now be illustrated in the following Examples.

EXAMPLE 1

A cream was produced from the following ingredients:

|  | % |
| --- | --- |
| skim milk | 58.42 |
| thickening agent (CMC) | 0.50 |
| salt | 1.00 |
| potassium sorbate | 0.08 |
| butter oil | 39.85 |
| lecithin | 0.15 |
| The pH was 5.2. | |

The solids profile of the butter oil was as follows: $N_5 = 42$, $N_{15} = 26$, $N_{25} = 8$, $N_{35} = 0$.

The cream was prepared as follows: The lecithin was dissolved in the butter oil at 60° C. and the salt and the sorbate were dissolved in skim milk at 60° C. The oil phase was dispersed in the skim milk using a Silverson mixer. The coarse emulsion was homogenized to obtain a droplet size from 2-10 micron (mode 6 micron). The thickening agent was added, the pH was adjusted using a small amount of lactic acid and the cream was pasteurized at 80° C.

The cream was cooled to 5° C. in a tank and kept at this temperature for 1 hour to crystallize the fat (11% solids on cream).

The temperature of the cream was then allowed to rise to about 15° C. (11% solids on cream) and the cream was shear-churned (in the absence of air) in a jacketed tank fitted with a scrape wall gate stirrer. The cream was sheared until the viscosity rose to 67,500 mPa.s at 42 s$^{-1}$. The C value of the product was about 300 g/cm$^2$ at 5° C. Its electric conductivity was about 5000 microScm$^{-1}$. The viscosity was measured using a hand-held Couette-type viscosimeter.

Micrographs of the spread showed a network of aggregated fat droplets and both encapsulated and free aqueous phase.

The spread was presented to a panel of experts who assessed the product. The product was found to have excellent butter-like properties and a good salt release.

EXAMPLE 2

The cream was prepared as in Example 1. The cream was then cooled by passing the pasteurised cream (80° C.) through two A units at −20° C. The exit temperature was 8° C. The cream was then held below 8° C. for one hour before warming to 15° C. and churning as in Example 1.

EXAMPLE 3

The cream was prepared as in Example 1 and cooled as in Example 1 or 2. The cream was then warmed to 15° C. in the tank and shear-churned using a static mixer with 24 elements. The degree of churning was controlled by the throughput to give a product with a viscosity of 67500 mPa.s at 42 s$^-$, having an electric conductivity of around 5000 microScm$^{-1}$.

EXAMPLES 4–6

"Limited inversion" spreads were produced as in Example 1 but with fat blends of the following composition:

|       |                              | %     |
|-------|------------------------------|-------|
| Ex. 4:| Butter oil                   | 33.87 |
|       | Hardened palm oil (mp 58° C.)| 5.98  |
|       | Bolec Z                      | 0.15  |
| Ex. 5:| Butter oil                   | 31.88 |
|       | Hardened palm oil (mp 43° C.)| 7.97  |
|       | Bolec Z                      | 0.15  |
| Ex. 6:| Tallow olein                 | 39.85 |
|       | Bolec Z                      | 0.15  |

All the above products had similar rheological properties to the product of Example 1, but somewhat different sensory properties. The product of Ex. 4 had a C value at 5° C. of 210 g/cm$^2$ and an electric conductivity of 5146 microScm$^{-1}$; the product of Ex. 5 had a C-value at 5° C. of 170 g/cm$^2$ and an electric conductivity of 5140 microScm$^{-1}$, and the product of Ex. 6 had a C-value at 5° C. of 320 g/cm$^2$ and an electric conductivity of 5129 microScm$^{-1}$.

EXAMPLES 7–9

"Limited inversion" spreads were produced as in Example 1, but with the following aqueous phases:

|       |                   | %     |
|-------|-------------------|-------|
| Ex. 7:| Skim milk         | 58.42 |
|       | Salt              | 1.00  |
|       | Potassium sorbate | 0.08  |
|       | Guar gum          | 0.50  |
| Ex. 8:| Skim milk         | 58.42 |
|       | Salt              | 1.00  |
|       | Potassium sorbate | 0.08  |
|       | Locust bean gum   | 0.50  |
| Ex. 9:| Skim milk         | 52.92 |
|       | Salt              | 1.00  |
|       | Potassium sorbate | 0.08  |
|       | Sodium caseinate  | 6.00. |

All the above products had similar sensory properties, but somewhat different rheological properties.

The product of Ex. 7 had a C-value at 5° C. of 235 g/cm$^2$ and an electric conductivity of 3650 microScm$^{-1}$; the product of Ex. 8 had a C-value at 5° C. of 155 g/cm$^2$ and an electric conductivity of 4150 microScm$^{-1}$; the product of Ex. 9 had a C-value at 5° C. of 570 g/cm$^2$ and an electric conductivity of 3150 microScm$^{-1}$.

I claim:

1. A process for producing a spread, comprising:
   (a) producing an oil-in-water emulsion-cream containing 35–75% of an aqueous phase and 25–65 wt % of a fat with the following fat solids profile:

$N_5=40$–$75$, $N_{15}=20$–$60$, $N_{25}=5$–$45$, $N_{35}=0$–$10$;

(b) subjecting said cream to shear-churning in the absence of an air/water interface at a temperature at which 5–50 wt % of the fat is present in crystallized form, to increase its viscosity up to a value close to or equal to the peak viscosity whereby partial phase inversion is achieved, to obtain a spread with substantially the same level of fat as the starting cream, said spread comprising a network of aggregated fat and both encapsulated and free aqueous phase.

2. A process according to claim 1, in which the cream is churned at a temperature at which 10–25 wt % of crystallized fat is present.

3. A process according to claim 1, in which churning is carried out at a temperature ranging from 12° to 21° C.

4. A process according to claim 3, in which churning is carried out at 13°–17° C.

5. A process according to claim 1, in which prior to churning the cream is cooled to a temperature from 2° to 10° C. to achieve at least partial crystallization of the fat.

6. A process according to claim 1, in which the cream has a fat level ranging from 30–50 wt %.

7. A process according to claim 1, in which the cream consists of a reconstituted cream produced from fat selected from the group consisting of tallow fat, palm oil, palm kernel oil, butterfat, hydrogenated palm oil, hydrogenated palm kern oil, fractions thereof and mixtures of these fats with a liquid oil.

8. A process according to claim 1, in which the cream contains an emulsifying system promoting the wettability of fat crystals by the aqueous phase.

9. A process according to claim 8, in which the emulsifying system is selected from the group consisting of lecithins, unsaturated monoglycerides, sorbitan fatty acid esters, sodium stearoyl lactylate or mixtures thereof.

10. A process according to claim 1, in which a single cream is split-fed in two portions in step (b) and processed under conditions achieving different degrees of churning by stopping the churning reaction at pre-selected points in time.

11. A process according to claim 1, in which two or more creams having different compositions are split-fed in step (b) and processed under conditions achieving different degrees of churning by stopping the churning reaction at pre-selected points in time.

12. A process according to claim 1, wherein a spread is obtained having an electric conductivity exceeding 1000 microScm$^{-1}$.

13. A process according to claim 12, in which a spread is produced having an electric conductivity ranging from 2000 to 6000 microScm$^{-1}$.

14. A process according to claim 1, in which a spread is produced having a hardness expressed in C value, measured at 5° C., ranging from 70 to 2000 g/cm$^2$.

15. Oil- and water-containing edible spread, comprising
(i) a level of 35–75 wt % of an aqueous phase;
(ii) a level of 25–65 wt % of a fat having the following fat solids profile:

$N_5 = 40-75$; $N_{15} = 20-60$; $N_{25} = 5-45$; $N_{35} = 0-10$;

(iii) An electric conductivity exceeding 1000 microScm$^{-1}$;

(iv) A hardness expressed in C values measured at 5° C. exceeding 70 g/cm$^2$;

said spread comprising a network of partially aggregated fat and containing both encapsulated and free aqueous phase.

16. Oil- and water-containing spread according to claim 15, wherein said spread is substantially free from occluded air.

17. Oil- and water-containing spread according to claim 15, wherein the fat comprises hydrogenated and/or non-hydrogenated fats or fat fractions thereof, selected from the group consisting of tallow fat, palm oil, palm kernel oil, babassu oil, coconut oil, butter oil and liquid oils wherein at least 60% of the fatty acid residues contain 18 or more carbon atoms.

18. Oil- and water-containing spread according to claim 15, wherein the spread contains an emulsifying system conferring on a crystal surface of the fat at the interface a contact angle which exceeds 90° when measured in the oil phase.

19. Oil- and water-containing spread according to claim 18, wherein the emulsifying system is selected from the group consisting of lecithins, unsaturated monoglycerides, sorbitan fatty acid esters, sodium stearoyl lactylate or mixtures thereof.

20. Oil- and water-containing spread according to claim 15, wherein the hardness of the spread expressed in C value measured at 5° C. ranges from 70 to 2000 g/cm$^2$.

21. Oil- and water-containing spread according to claim 15, wherein the electric conductivity ranges from 1000 to 6000 microScm$^{-1}$.

* * * * *